(12) United States Patent  
Morita

(10) Patent No.: US 7,545,383 B2  
(45) Date of Patent: Jun. 9, 2009

(54) INFORMATION PROCESSING SYSTEM, INFORMATION PROCESSOR, INFORMATION PROCESSING METHOD, AND PROGRAM

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 11/395,209

(22) Filed: Apr. 3, 2006

(65) Prior Publication Data

US 2006/0250374 A1  Nov. 9, 2006

(30) Foreign Application Priority Data

Apr. 26, 2005 (JP) .............................. 2005-128195

(51) Int. Cl.
*G09G 5/00* (2006.01)
(52) U.S. Cl. ........................ 345/538; 345/156; 345/204; 345/501; 345/530; 345/543; 710/1; 710/8; 710/104; 711/147
(58) Field of Classification Search ................. 345/156, 345/204, 501, 530, 538, 543; 710/1, 8, 104; 711/147
See application file for complete search history.

(56) References Cited

U.S. PATENT DOCUMENTS

| | | | | |
|---|---|---|---|---|
| 5,483,642 A | * | 1/1996 | Okazawa et al. | 710/306 |
| 5,872,637 A | * | 2/1999 | Nakanishi | 358/403 |
| 2004/0073907 A1 | * | 4/2004 | Noel et al. | 718/104 |
| 2005/0015568 A1 | * | 1/2005 | Noel et al. | 711/206 |

* cited by examiner

*Primary Examiner*—Bipin Shalwala  
*Assistant Examiner*—Vince E Kovalick  
(74) *Attorney, Agent, or Firm*—Oblon, Spivak, McClelland, Maier & Neustadt, P.C.

(57) ABSTRACT

An information processing system includes a first information processor to process data to be displayed in a first display unit and a second information processor to indicate the data displayed in the first display unit. The first information processor includes a first display control unit to control the data to be displayed; a first communication unit to receive operation information from the second information processor and transmit data information about a piece of data indicated by the second information processor; and a first detecting unit to detect a position on the first display unit indicated by the second information processor. The second information processor includes an accepting unit to accept an operation by a user; a second communication unit to transmit operation information to the first information processor and receive the data information from the first information processor; and a received data storage unit to store the data information.

25 Claims, 9 Drawing Sheets

INFORMATION PROCESSING SYSTEM, INFORMATION PROCESSOR, INFORMATION PROCESSING METHOD, AND PROGRAM

CROSS REFERENCES TO RELATED APPLICATIONS

The present invention contains subject matter related to Japanese Patent Application JP 2005-128195 filed in the Japanese Patent Office on Apr. 26, 2005, the entire contents of which are incorporated herein by reference.

BACKGROUND OF THE INVENTION

1. Field of the Invention

The present invention relates to an information processing system, an information processor, an information processing method, and a program. Particularly, the present invention relates to an information processing system, an information processor, an information processing method, and a program capable of copying or moving data displayed on a screen more easily.

2. Description of the Related Art

A compact mobile terminal apparatus, such as a PDA (personal digital assistant) or an electronic notebook, may be provided with a touch panel and a pen as an input unit if the terminal apparatus does not have space to accommodate an input unit having a sufficient operability, such as a keyboard and a mouse for a desktop PC (personal computer).

For an apparatus using a touch pen, a method for easily selecting various processes, such as data transmission, has been suggested (e.g., see Patent Document 1: Japanese Unexamined Patent Application Publication No. 11-45149 and Patent Document 2: Japanese Unexamined Patent Application Publication No. 11-53236).

When a user who is inputting a sentence in a predetermined application started in a compact mobile terminal apparatus performs a copy-and-paste operation on an input character by using a touch panel and a touch pen, the following steps are performed.

1. Input (specify) a "copy command" with the touch pen.
2. Select a character to be copied. Accordingly, the selected character is temporarily stored in a memory of the compact mobile terminal apparatus.
3. Input (specify) a "paste command" with the touch pen.
4. Indicate a position where the character is to be pasted with the touch pen.

In this way, in the copy-and-paste operation of a character using the touch panel and the touch pen, four steps are required. In other words, four touches by the touch pen are required. This poor operability of many steps causes inconvenience, for example, the user has difficulty learning the operation, or the user may input the same character again without doing a copy-and-paste operation, if the copied character is simple.

If a mouse is provided as an input unit as in a desktop PC, a method for easily performing a copy-and-paste operation, using a combination of a caret displayed on a screen and an operation on buttons of the mouse (specifying a position or selecting a command menu by right click), can be adopted. However, an operation using a touch panel and a pen is basically limited to two types of operations: touching the touch panel with the pen; and moving the pen on the touch panel. Therefore, a copy-and-paste operation has conventionally been performed by using a button of the compact mobile terminal apparatus and the pen or by inputting commands with the pen.

SUMMARY OF THE INVENTION

However, an operation using both a button of the apparatus and a pen or an operation of inputting commands with the pen is not intuitive, so that the user has difficulty performing an operation.

The present invention has been made in view of these circumstances, and is directed to enabling a user to copy or move data displayed on a screen more easily.

An information processing system according to an embodiment of the present invention includes a first information processor and a second information processor. The first information processor includes a first display control unit configured to control data to be displayed in a first display unit; a first communication unit configured to receive operation information indicating an operation performed by a user in the second information processor from the second information processor and transmit data information about a piece of data indicated by the second information processor among the data displayed in the first display unit; and a first detecting unit configured to detect a position on the first display unit indicated by the second information processor. The second information processor includes an accepting unit configured to accept an operation by a user; a second communication unit configured to transmit operation information indicating an operation performed by the user to the first information processor and receive the data information from the first information processor; and a received data storage unit configured to store the data information received by the second communication unit. The accepting unit accepts a first operation performed by the user. The second communication unit transmits operation information indicating the first operation to the first information processor. The first communication unit receives the operation information indicating the first operation from the second information processor. After the operation information indicating the first operation has been received, the first detecting unit detects a first position on the first display unit indicated by the second information processor. The first communication unit transmits the data information about the indicated data displayed at the first position. The second communication unit receives the data information from the first information processor. The received data storage unit stores the data information received by the second communication unit. The accepting unit accepts a second operation performed by the user. The second communication unit transmits operation information indicating the second operation to the first information processor. The first communication unit receives the operation information indicating the second operation from the second information processor and transmits a request for the data information to the second information processor. After the operation information indicating the second operation has been received, the first detecting unit detects a second position on the first display unit indicated by the second information processor. The second communication unit transmits the data information stored in the received data storage unit in response to the request for the data information from the first information processor. The first communication unit receives the data information transmitted from the second information processor. The first display control unit displays the indicated data at the second position of the first display unit on the basis of the data information received by the first communication unit.

The data information may be the indicated data.

The data information may be data identifying information to identify the indicated data. The first information processor may further include an indicated data storage unit configured to store the indicated data indicated by the second information processor. The first display control unit may allow the indicated data storage unit to store the indicated data displayed at the first position detected by the first detecting unit and display the indicated data stored in the indicated data storage unit at the second position of the first display unit on the basis of the data identifying information received by the first communication unit.

The accepting unit may be a switch, the first operation may be pressing the switch, and the second operation may be releasing the switch.

The first or second communication unit may perform near field communication through radio waves. The second information processor may further include a power extracting unit configured to extract power from radio waves transmitted from the first communication unit and start up when a predetermined or more amount of power is extracted by the power extracting unit.

The information processing system may further include a third information processor to communicate with the second information processor. The third information processor may include a second display control unit configured to control data to be displayed in a second display unit; a third communication unit configured to receive operation information indicating an operation performed by the user in the second information processor from the second information processor and receive data information about the indicated data from the second information processor; and a second detecting unit configured to detect a position on the second display unit indicated by the second information processor. The third communication unit may receive operation information indicating the second operation from the second information processor and transmit a request for the data information to the second information processor. After the operation information indicating the second operation has been received, the second detecting unit may detect a third position on the second display unit indicated by the second information processor. The third communication unit may receive the data information transmitted from the second information processor in response to the request for the data information. The second display control unit may display the indicated data at the third position of the second display unit on the basis of the data information received by the third communication unit.

The data information may be the indicated data.

The data information may be data identifying information to identify the indicated data. The first information processor may further include an indicated data storage unit configured to store the indicated data indicated by the second information processor; and a fourth communication unit configured to communicate with the third information processor in a communication method different from that of the first communication unit. The third information processor may further include a fifth communication unit configured to communicate with the first information processor in a communication method which is different from that of the third communication unit and which is the same as that of the fourth communication unit. The first display control unit may allow the indicated data storage unit to store the indicated data displayed at the first position detected by the first detecting unit. The fifth communication unit may transmit the data identifying information that has been received by the third communication unit from the second information processor to the first information processor. The fourth communication unit may receive the data identifying information transmitted from the third information processor and transmit the indicated data stored in the indicated data storage unit to the third information processor on the basis of the data identifying information. The fifth communication unit may receive the indicated data transmitted from the first information processor. The second display control unit may display the indicated data received by the fifth communication unit at the third position of the second display unit.

A first information processing method according to an embodiment of the present invention includes the steps of: accepting, in the accepting unit, a first operation performed by a user; transmitting, in the second communication unit, operation information indicating the first operation to the first information processor; receiving, in the first communication unit, the operation information indicating the first operation from the second information processor; detecting, in the detecting unit, a first position on the display unit indicated by the second information processor after the operation information indicating the first operation has been received; transmitting, in the first communication unit, the data information about the indicated data displayed at the first position; receiving, in the second communication unit, the data information from the first information processor; storing, in the received data storage unit, the data information received by the second communication unit; accepting, in the accepting unit, a second operation performed by the user; transmitting, in the second communication unit, operation information indicating the second operation to the first information processor; receiving, in the first communication unit, the operation information indicating the second operation from the second information processor and transmitting a request for the data information to the second information processor; detecting, in the detecting unit, a second position on the display unit indicated by the second information processor after the operation information indicating the second operation has been received; transmitting, in the second communication unit, the data information stored in the received data storage unit in response to the request for the data information from the first information processor; receiving, in the first communication unit, the data information transmitted from the second information processor; and displaying, in the display control unit, the indicated data at the second position of the display unit on the basis of the data information received by the first communication unit.

In the above-described information processing system and first information processing method, the accepting unit accepts a first operation performed by the user, the second communication unit transmits operation information indicating the first operation to the first information processor, and the first communication unit receives the operation information indicating the first operation from the second information processor. After the operation information indicating the first operation has been received, the first detecting unit detects a first position on the first display unit indicated by the second information processor. The first communication unit transmits the data information about the indicated data displayed at the first position. The second communication unit receives the data information from the first information processor. The received data storage unit stores the data information received by the second communication unit. The accepting unit accepts a second operation performed by the user. The second communication unit transmits operation information indicating the second operation to the first information processor. The first communication unit receives the operation information indicating the second operation from the second information processor and transmits a request for the data information to the second information processor. After the operation information indicating the second operation has been received, the first detecting unit detects a second position on the first display unit indicated by the second information processor. The second communication unit transmits the data information stored in the received data storage unit in response to the request for the data information from the first information processor. The first communication unit receives the data information transmitted from the second information processor. The first display control unit displays the indicated data at the second position of the first display unit on the basis of the data information received by the first communication unit.

A first information processor according to an embodiment of the present invention includes a display control unit configured to control data to be displayed in a display unit; a first communication unit configured to receive operation information indicating an operation performed by a user in a first apparatus from the first apparatus and transmit data information about a piece of data indicated by the first apparatus among the data displayed in the display unit; and a detecting unit configured to detect a position on the display unit indicated by the first apparatus. The first communication unit receives operation information indicating a first operation performed by the user from the first apparatus. After the first communication unit has received the operation information indicating the first operation, the detecting unit detects a first position on the display unit indicated by the first apparatus. The first communication unit transmits the data information about the indicated data displayed at the first position and transmits a request for the data information to the first apparatus after receiving operation information indicating a second operation performed by the user from the first apparatus. After the first communication unit has received the operation information indicating the second operation, the detecting unit detects a second position on the display unit indicated by the first apparatus. The first communication unit receives the data information transmitted from the first apparatus in response to the request for the data information. The display control unit displays the indicated data at the second position of the display unit on the basis of the data information received by the first communication unit.

The data information may be the indicated data.

The data information may be data identifying information to identify the indicated data. The information processor may further include an indicated data storage unit configured to store the indicated data indicated by the first apparatus. The display control unit may allow the indicated data storage unit to store the indicated data displayed at the first position detected by the detecting unit and display the indicated data stored in the indicated data storage unit at the second position of the display unit on the basis of the data identifying information received by the first communication unit.

The information processor may further include a second communication unit configured to communicate with a second apparatus in a communication method different from that of the first communication unit. The display control unit may allow the indicated data storage unit to store the indicated data displayed at the first position detected by the detecting unit. The second communication unit may receive the data identifying information transmitted from the second apparatus and transmit the indicated data stored in the indicated data storage unit to the second apparatus on the basis of the data identifying information.

The first communication unit may perform near field communication with the first apparatus through radio waves. The first apparatus may include a power extracting unit configured to extract power from radio waves transmitted from the first communication unit and start up when a predetermined or more amount of power is extracted by the power extracting unit.

A second information processing method according to an embodiment of the present invention includes the steps of: receiving, in the first communication unit, operation information indicating a first operation performed by a user from another apparatus; detecting, in the detecting unit, a first position on the display unit indicated by the other apparatus after the first communication unit has received the operation information indicating the first operation; transmitting, in the first communication unit, the data information about the indicated data displayed at the first position, and transmitting a request for the data information to the other apparatus after receiving operation information indicating a second operation performed by the user from the other apparatus; detecting, in the detecting unit, a second position on the display unit indicated by the other apparatus after the first communication unit has received the operation information indicating the second operation; receiving, in the first communication unit, the data information transmitted from the other apparatus in response to the request for the data information; and displaying, in the display control unit, the indicated data at the second position of the display unit on the basis of the data information received by the first communication unit.

A first program according to an embodiment of the present invention includes the steps of: receiving, in the first communication unit, operation information indicating a first operation performed by a user from another apparatus; detecting, in the detecting unit, a first position on the display unit indicated by the other apparatus after the first communication unit has received the operation information indicating the first operation; transmitting, in the first communication unit, the data information about the indicated data displayed at the first position, and transmitting a request for the data information to the other apparatus after receiving operation information indicating a second operation performed by the user from the other apparatus; detecting, in the detecting unit, a second position on the display unit indicated by the other apparatus after the first communication unit has received the operation information indicating the second operation; receiving, in the first communication unit, the data information transmitted from the other apparatus in response to the request for the data information; and displaying, in the display control unit, the indicated data at the second position of the display unit on the basis of the data information received by the first communication unit.

In the above-described first information processor, second information processing method, and first program, the first communication unit receives operation information indicating a first operation performed by the user from another apparatus. After the first communication unit has received the operation information indicating the first operation, the detecting unit detects a first position on the display unit indicated by the other apparatus. The first communication unit transmits the data information about the indicated data displayed at the first position and transmits a request for the data information to the other apparatus after receiving operation information indicating a second operation performed by the user from the other apparatus. After the first communication unit has received the operation information indicating the second operation, the detecting unit detects a second position on the display unit indicated by the other apparatus. The first communication unit receives the data information transmitted from the other apparatus in response to the request for the data information. The display control unit displays the indicated data at the second position of the display unit on the basis of the data information received by the first communication unit.

A second information processor according to an embodiment of the present invention includes an accepting unit configured to accept an operation performed by a user; a communication unit configured to transmit operation information indicating the operation performed by the user to another apparatus and receive data information about a piece of data indicated by the information processor among the data displayed in a display unit from the other apparatus; and a received data storage unit configured to store the data information received by the communication unit. The accepting unit accepts a first operation performed by the user. The communication unit transmits operation information indicating the first operation to the other apparatus and receives the data information from the other apparatus. The received data storage unit stores the data information received by the communication unit. The accepting unit accepts a second operation performed by the user. The communication unit transmits operation information indicating the second operation to the other apparatus, and transmits the data information stored in the received data storage unit to the other apparatus after receiving a request for the data information from the other apparatus.

The data information may be the indicated data or data identifying information to identify the indicated data.

The accepting unit may be a switch, the first operation may be pressing the switch, and the second operation may be releasing the switch.

The communication unit may perform near field communication with the other apparatus through radio waves.

A third information processing method according to an embodiment of the present invention includes the steps of: accepting, in the accepting unit, a first operation performed by the user; transmitting, in the communication unit, operation information indicating the first operation to the other apparatus and receiving the data information from the other apparatus; storing, in the received data storage unit, the data information received by the communication unit; accepting, in the accepting unit, a second operation performed by the user; and transmitting, in the communication unit, operation information indicating the second operation to the other apparatus, and transmitting the data information stored in the received data storage unit to the other apparatus after receiving a request for the data information from the other apparatus.

A second program according to an embodiment of the present invention includes the steps of: accepting, in the accepting unit, a first operation performed by the user; transmitting, in the communication unit, operation information indicating the first operation to the other apparatus and receiving the data information from the other apparatus; storing, in the received data storage unit, the data information received by the communication unit; accepting, in the accepting unit, a second operation performed by the user; and transmitting, in the communication unit, operation information indicating the second operation to the other apparatus, and transmitting the data information stored in the received data storage unit to the other apparatus after receiving a request for the data information from the other apparatus.

In the above-described second information processor, third information processing method, and second program, the accepting unit accepts a first operation performed by the user. The communication unit transmits operation information indicating the first operation to the other apparatus and receives the data information from the other apparatus. The received data storage unit stores the data information received by the communication unit. The accepting unit accepts a second operation performed by the user. The communication unit transmits operation information indicating the second operation to the other apparatus, and transmits the data information stored in the received data storage unit to the other apparatus after receiving a request for the data information from the other apparatus.

According to the embodiments of the present invention, data displayed on a screen can be copied or moved more easily.

DESCRIPTION OF THE PREFERRED EMBODIMENTS

Figure 1:
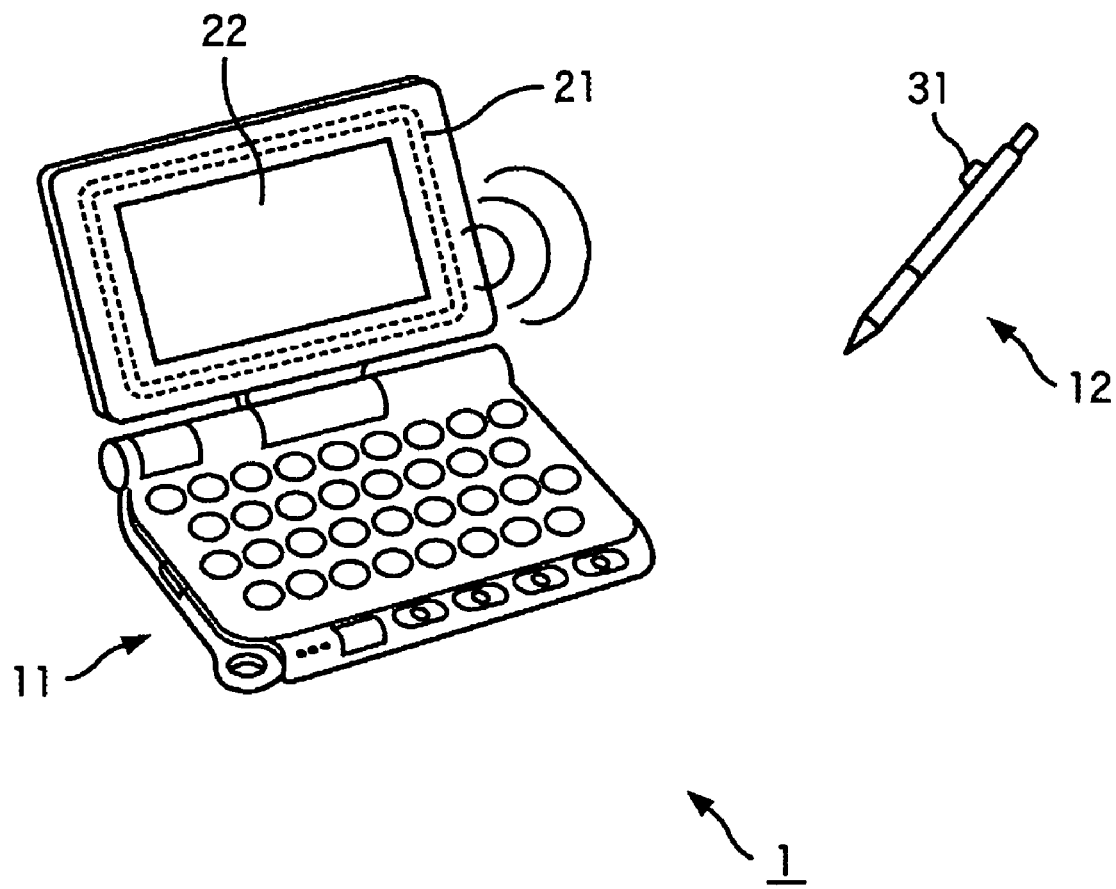
FIG. 1 shows an example of a configuration of a display system according to an embodiment of the present invention.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An information processing system according to an embodiment of the present invention (e.g., the display system 1 shown in FIG. 1) includes a first information processor to process data to be displayed in a first display unit; and a second information processor to indicate the data displayed in the first display unit. The first information processor (e.g., the terminal apparatus 11 shown in FIG. 1) includes a first display control unit (e.g., the CPU 51 shown in FIG. 2) configured to control the data to be displayed in the first display unit; a first communication unit (e.g., the NFC communication unit 58 shown in FIG. 2) configured to receive operation information indicating an operation performed by a user in the second information processor from the second information processor and transmit data information about a piece of data indicated by the second information processor among the data displayed in the first display unit; and a first detecting unit (e.g., the touch panel 72 shown in FIG. 2) configured to detect a position on the first display unit (e.g., the display unit 71 shown in FIG. 2) indicated by the second information processor. The second information processor (e.g., the pen 12 shown in FIG. 1) includes an accepting unit (e.g., the switch 31 shown in FIG. 4) configured to accept an operation by a user; a second communication unit (e.g., the communication unit 101 shown in FIG. 4) configured to transmit operation information indicating an operation performed by the user to the first information processor and receive the data information from the first information processor; and a received data storage unit (e.g., the storage unit 104 shown in FIG. 4) configured to store the data information received by the second communication unit. The accepting unit accepts a first operation performed by the user. The second communication unit transmits operation information (e.g., ON-information) indicating the first operation (e.g., ON-operation on the switch 31) to the first information processor. The first communication unit receives the operation information indicating the first operation from the second information processor. After the operation information indicating the first operation has been received, the first detecting unit detects a first position on the first display unit indicated by the second information processor. The first communication unit transmits the data information (e.g., a memory ID) about the indicated data (e.g., a copied character) displayed at the first position (e.g., the touched position A). The second communication unit receives the data information from the first information processor. The received data storage unit stores the data information received by the second communication unit. The accepting unit accepts a second operation (e.g., OFF-operation on the switch 31) performed by the user. The second communication unit transmits operation information (e.g., OFF-information) indicating the second operation to the first information processor. The first communication unit receives the operation information indicating the second operation from the second information processor and transmits a request for the data information (e.g., a stored information request) to the second information processor. After the operation information indicating the second operation has been received, the first detecting unit detects a second position (e.g., the touched position B) on the first display unit indicated by the second information processor. The second communication unit transmits the data information stored in the received data storage unit in response to the request for the data information from the first information processor. The first communication unit receives the data information transmitted from the second information processor. The first display control unit displays the indicated data at the second position of the first display unit on the basis of the data information received by the first communication unit.

In the information processing system, the data information is data identifying information to identify the indicated data. The first information processor further includes an indicated data storage unit (e.g., the RAM 53 shown in FIG. 2) configured to store the indicated data indicated by the second information processor. The first display control unit allows the indicated data storage unit to store the indicated data displayed at the first position detected by the first detecting unit and displays the indicated data stored in the indicated data storage unit at the second position of the first display unit on the basis of the data identifying information received by the first communication unit.

In the information processing system, the first or second communication unit performs near field communication through radio waves. The second information processor further includes a power extracting unit (e.g., the power extracting unit 102 shown in FIG. 4) configured to extract power from radio waves transmitted from the first communication unit and starts up when a predetermined or more amount of power is extracted by the power extracting unit.

Hereinafter, the embodiments of the present invention are described with reference to the drawings.

FIG. 1 shows an example of a configuration of a display system according to an embodiment of the present invention.

The display system 1 shown in FIG. 1 includes a terminal apparatus 11 and a pen 12.

The terminal apparatus 11 is a compact (mobile) apparatus capable of performing predetermined data processing in accordance with an application (program) stored therein. The terminal apparatus 11 includes at least an antenna 21 and a touch-panel display 22.

The terminal apparatus 11 starts the application and displays data processed with the started application on the touch-panel display 22. Herein, if the application is a document creating software, characters (sentences) corresponding to a loaded document file are displayed on the touch-panel display 22.

The terminal apparatus 11 has an NFC (near field communication) function and is capable of performing near field communication with the pen 12 that also has an NFC function (NFC pen) by electromagnetic induction using carrier waves of a single frequency, through the antenna 21 embedded at the periphery of the touch-panel display 22.

As a frequency of carrier waves used by the terminal apparatus 11 and the pen 12, 13.56 MHz in an ISM (industrial scientific medical) band can be adopted, for example.

The near field communication means communication performed between nearby apparatuses, the distance therebetween being within several tens of centimeters (hereinafter referred to as a "short distance"), and also includes communication performed between apparatuses (packages) touching each other.

The pen 12 is a pen-shaped pointing device and is used by a user to indicate a predetermined position on the touch-panel display 22. The pen 12 is provided with a switch 31. When the switch 31 is turned on or off by the user, the pen 12 transmits ON-information or OFF-information to the terminal apparatus 11 by near field communication. Also, the pen 12 receives data transmitted from the terminal apparatus 11 in accordance with the transmitted ON-information or OFF-information and stores the data therein.

Figure 2:
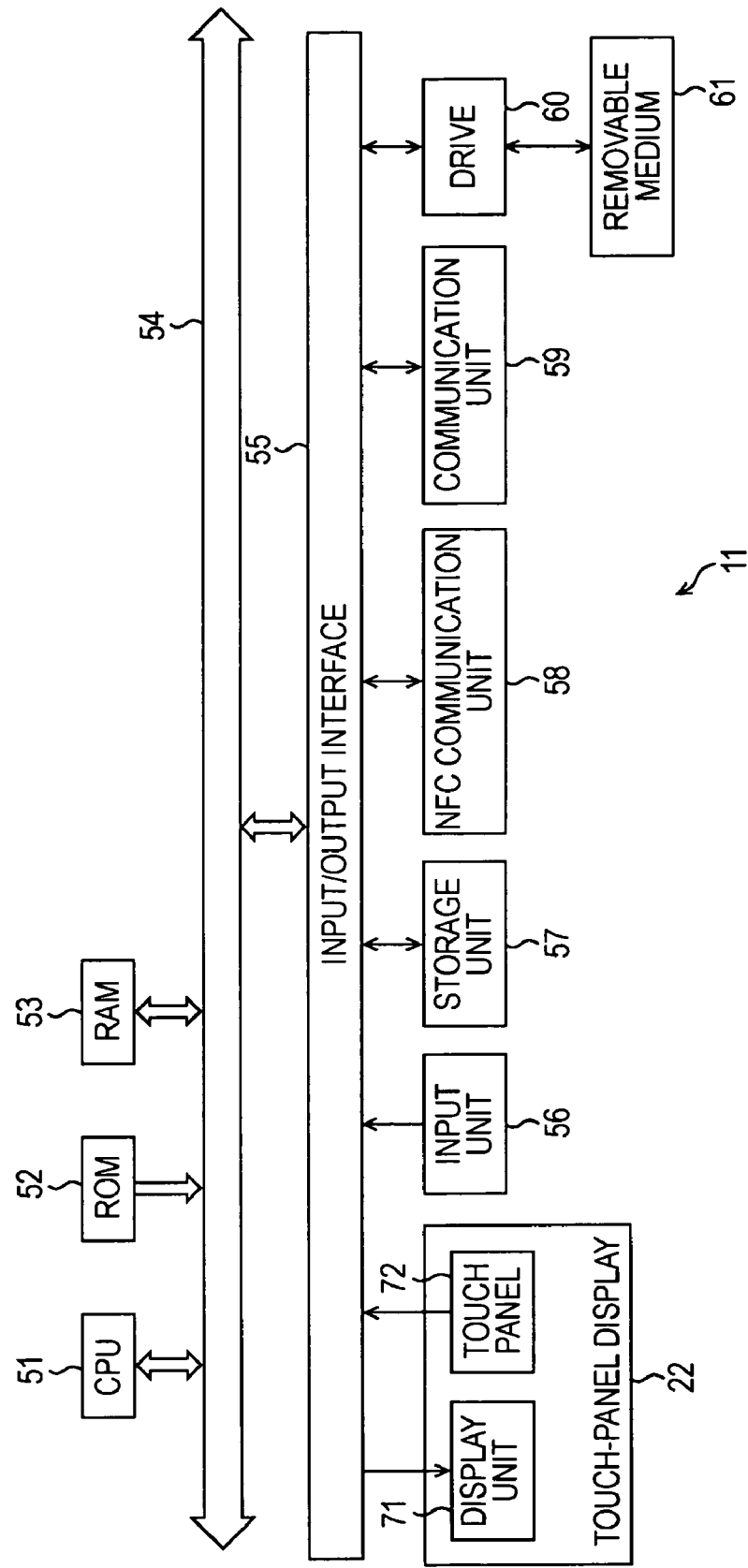
FIG. 2 is a block diagram showing an example of a hardware configuration of a terminal apparatus.

FIG. 2 is a block diagram showing an example of a hardware configuration of the terminal apparatus 11.

A CPU (central processing unit) 51 executes various processes in accordance with a program stored in a ROM (read only memory) 52 or a program loaded from a storage unit 57 to a RAM (random access memory) 53. For example, the CPU 51 controls data to be displayed on the touch-panel display 22. The RAM 53 adequately stores data required by the CPU 51 to execute various processes.

The CPU 51, the ROM 52, and the RAM 53 connect to each other through a bus 54. The bus 54 connects to an input/output interface 55.

The input/output interface 55 connects to the touch-panel display 22, an input unit 56 including a keyboard and operation buttons or the like, a storage unit 57 including a hard disk or the like, an NFC communication unit 58 to perform an NFC communication process, and a communication unit 59 to perform a communication process in a wired or wireless manner in a wider range than the range in which the NFC communication unit 58 performs communication. The communication performed by the communication unit 59 is based on a standard, such as IEEE (Institute of Electrical and Electronic Engineers) 1394, IEEE 802.11a, IEEE 802.11b, IEEE 802.11g, or Bluetooth®.

The touch-panel display 22 includes a display unit 71, such as a LCD (liquid crystal display), on which a touch panel 72 is overlaid.

Addresses are assigned to a display area of the display unit 71. When the CPU 51 allows the display unit 71 to display predetermined data (characters, images, or icons), the CPU 51 specifies an address and supplies data thereto. The touch panel 72 detects a position touched by the pen 12 with the same address as that assigned to the display are of the display unit 71 and supplies the detected position to the CPU 51 through the input/output interface 55.

Accordingly, the CPU 51 can recognize which piece of data among the data displayed on the display unit 71 has been indicated (selected) by the pen 12.

The NFC communication unit 58 radiates radio waves (electromagnetic waves) and detects the pen 12 within the short distance through polling or the like. The NFC communication unit 58 exchanges predetermined data (challenge word) in a challenge response method or the like under control by the CPU 51, so as to authenticate the pen 12 (the terminal apparatus 11 and the pen 12 authenticate each other).

The NFC communication unit 58 receives the abovementioned ON-information or OFF-information from the pen 12 and supplies it to the CPU 51.

Upon turning on of the switch 31 of the pen 12 by a user, the CPU 51 receives ON-information from the pen 12 through the NFC communication unit 58. When the pen 12 is in touch with a predetermined position A (hereinafter referred to as a "touched position A") on the touch panel 72 (display unit 71), the address of the touched position A is supplied from the touch panel 72 to the CPU 51.

Then, the CPU 51 allows the RAM 53 to store the data that is displayed at the touched position A on the display unit 71 when the ON-information is received. In other words, among the data displayed on the display unit 71, a piece of data indicated with the pen 12 by the user (indicated data) is stored in the RAM 53.

Also, the CPU 51 transmits a memory ID (data identifying information) to identify the indicated data stored in the RAM 53 to the pen 12 through the NFC communication unit 58. Herein, the memory ID is address information indicating the address where the indicated data is stored.

After the user turns off the switch 31 of the pen 12 while allowing the pen 12 to be in touch with a predetermined position B (hereinafter referred to as a touched position B) on the touch panel 72, the CPU 51 transmits a stored information request (request for data information) to request the information stored in the pen 12 to the pen 12 through the NFC communication unit 58. Herein, the information stored in the pen 12 is the memory ID that was transmitted to the pen 12 when the CPU 51 received the ON-information.

Upon receiving the memory ID from the pen 12, the CPU 51 reads the indicated data stored in the RAM 53 on the basis of the memory ID and supplies the read data to the display unit 71 by specifying the position on the touch panel 72 touched by the pen 12 when the switch 31 was turned off (that is, the address of the touched position B). Accordingly, the data (indicated data) displayed at the touched position A of the display unit 71 is also displayed at the touched position B. In other words, the data displayed at the touched position A and indicated with the pen 12 by the user (indicated data) is copied to the touched position B on the display unit 71.

The CPU 51 encrypts data to be transmitted to the pen 12, such as a memory ID, in a predetermined encryption scheme, and also decrypts data transmitted from the pen 12, such as ON-information or OFF-information, in a predetermined encryption scheme. As an encryption scheme, a DES (data encryption standard) scheme, a 3-DES (triple DES) scheme, or an AES (advanced encryption standard) scheme is adopted.

A drive 60 is connected to the input/output interface 55 as required. A removable medium 61, such as a magnetic disk, an optical disc, a magneto-optical disc, or a semiconductor memory, is loaded onto the drive 60, and a computer program read therefrom is installed into the storage unit 57 as required.

Figure 3:
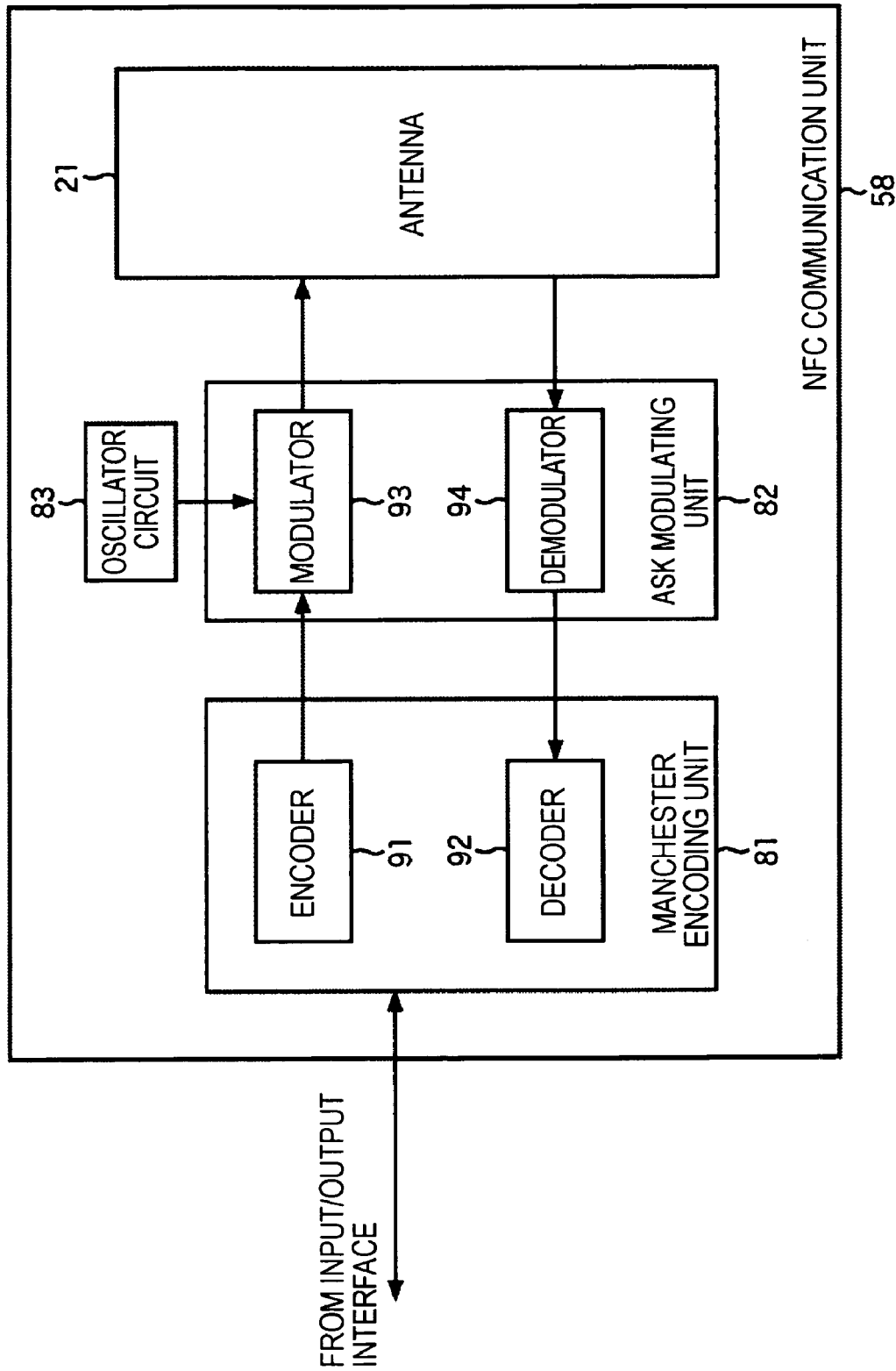
FIG. 3 is a block diagram showing an example of a specific configuration of an NFC communication unit.

FIG. 3 is a block diagram showing an example of a specific configuration of the NFC communication unit 58 shown in FIG. 2.

The NFC communication unit 58 includes the antenna 21, a Manchester encoding unit 81, an ASK (amplitude shift keying) modulating unit 82, and an oscillator circuit 83. The Manchester encoding unit 81 includes an encoder 91 and a decoder 92. The ASK modulating unit 82 includes a modulator 93 and a demodulator 94.

The encoder 91 encodes data (e.g., memory ID) supplied from the CPU 51 through the input/output interface 55 by Manchester encoding and supplies a Manchester-encoded signal to the modulator 93. The decoder 92 decodes a Manchester-encoded signal supplied from the demodulator 94 and supplies the decoded data (e.g., ON-information or OFF-information) to the CPU 51. As described above, data transmitted between the encoder 91 or the decoder 92 and the CPU 51 is encrypted in a predetermined encryption scheme.

The oscillator circuit 83 generates a clock signal of a predetermined frequency (e.g., 13.56 MHz) to generate carrier waves and supplies the clock signal to the modulator 93.

The modulator 93 generates carrier waves on the basis of the clock signal from the oscillator circuit 83 and modulates the carrier waves in the ASK method, so as to transmit data to the pen 12 through the antenna 21. The demodulator 94 receives ASK-modulated waves whose load is modulated by the pen 12 through the antenna 21, demodulates the waves to obtain data, and supplies a Manchester-encoded signal of the data to the decoder 92.

The antenna (antenna coil) 21 radiates radio waves (electromagnetic waves) corresponding to data to be transmitted/received.

Figure 4:
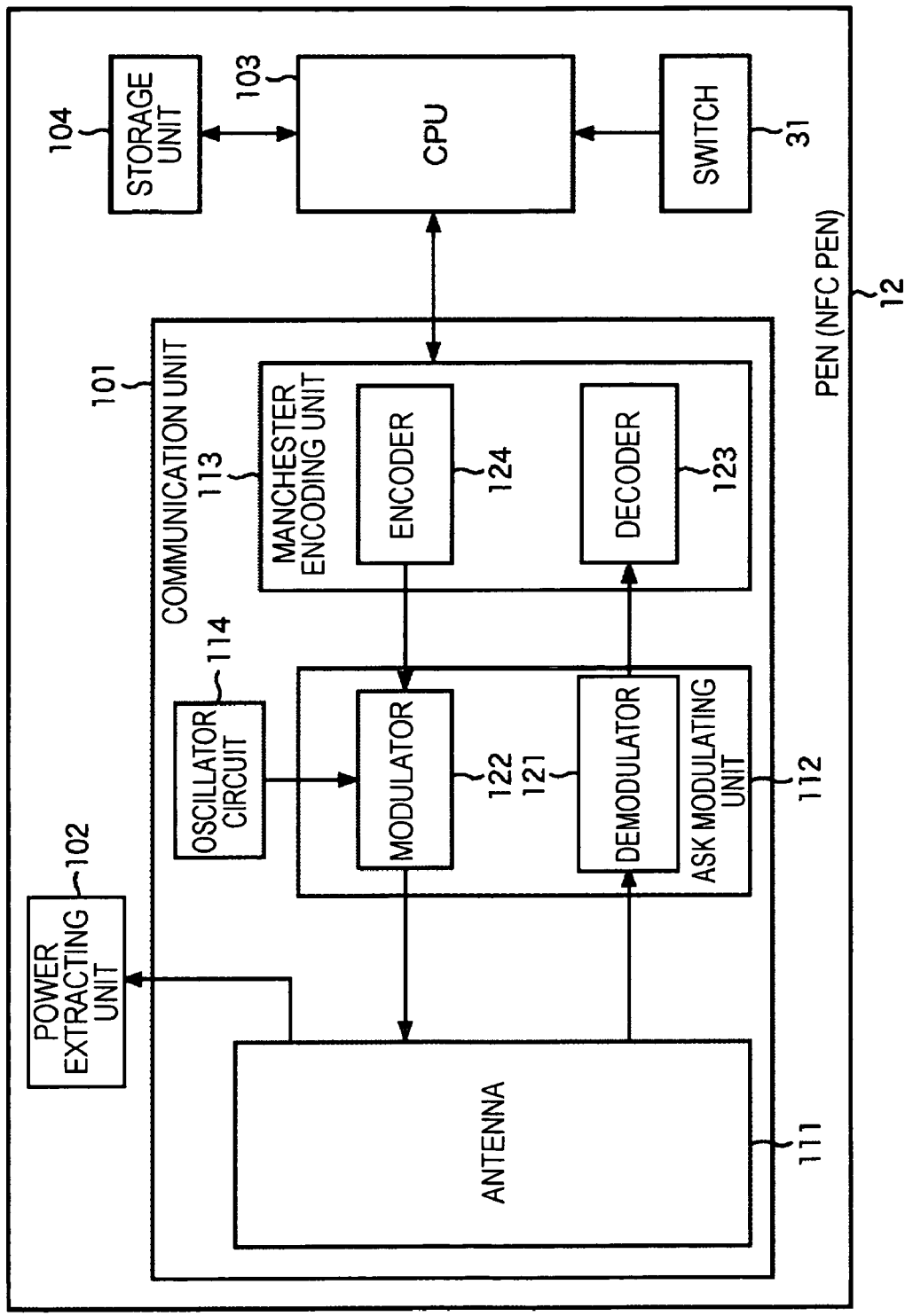
FIG. 4 is a block diagram showing an example of a specific configuration of a pen.

FIG. 4 is a block diagram showing an example of a specific configuration of the pen 12.

The pen 12 includes the switch 31, a communication unit 101, a power extracting unit 102, a CPU 103, and a storage unit 104. The communication unit 101 includes an antenna 111, an ASK modulating unit 112, a Manchester encoding unit 113, and an oscillator circuit 114.

A user allows the pen 12 to touch the touch panel 72 in order to indicate data to be copied among data displayed on the display unit 71, and turns on the switch 31 (this position is a touched position A). Then, the user moves the pen 12 to a position where the data is to be pasted on the touch panel 72 (display unit 71) and turns off the switch 31 (this position is a touched position B).

In other words, the user keeps the switch 31 pressed until the switch 31 is turned off after it is turned on. This operation corresponds to an action of moving a real object, for example, an action of capturing data to be copied and releases the data at a position where the data is to be pasted.

The switch 31 accepts an operation by a user. More specifically, the switch 31 supplies an ON-operation signal to the CPU 103 when the user presses the switch 31 and supplies an OFF-operation signal to the CPU 103 when the user releases the switch 31.

The communication unit 101 transmits/receives data, such as a memory ID, ON-information representing an ON-operation of the switch 31 performed by a user, and OFF-information representing an OFF-operation of the switch 31 (operation information), to/from the terminal apparatus 11.

The ASK modulating unit 112 includes a demodulator 121 and a modulator 122. The demodulator 121 receives ASK-modulated waves (radio waves) generated by the terminal apparatus 11 through the antenna 111, demodulates the ASK-modulated waves so as to obtain a Manchester-encoded signal, and supplies the signal to a decoder 123. The modulator 122 varies a load (not shown) connecting in parallel to the antenna 111 in accordance with a Manchester-encoded signal from an encoder 124, so as to ASK-modulate the modulation waves having a constant amplitude output from the terminal apparatus 11 and transmit data to the terminal apparatus 11.

The Manchester encoding unit 113 includes the decoder 123 and the encoder 124. The decoder 123 decodes a Manchester-encoded signal supplied from the demodulator 121 in order to obtain data and supplies the data to the CPU 103. The encoder 124 encodes data from the CPU 103 in the Manchester method in order to obtain a Manchester-encoded signal and supplies the signal to the modulator 122.

The power extracting unit 102 receives radio waves (ASK-modulated waves) output from (the NFC communication unit 58 of) the terminal apparatus 11 through the antenna 111, extracts power generated by the radio waves, and supplies the power to each block. Accordingly, the pen operates. Therefore, a user can semipermanently use the pen 12 as long as the pen 12 receives a predetermined or more radio waves from the terminal apparatus 11. The predetermined or more radio waves mean radio waves that are required to generate minimum power to operate the pen 12.

The CPU 103 processes data to be transmitted to the terminal apparatus 11 and data received from the terminal apparatus 11. For example, the CPU 103 allows the storage unit 104 to store a memory ID received by the communication unit 101. Also, the CPU 103 allows the communication unit 101 to transmit ON-information or OFF-information on the basis of an ON- or OFF-operation signal supplied from the switch 31.

As described above, data transmitted/received to/from the terminal apparatus 11 is encrypted in a predetermined encryption scheme. The CPU 103 decrypts received data in a predetermined encryption scheme and encrypts data to be transmitted to the terminal apparatus 11 in a predetermined encryption scheme.

The storage unit 104 includes a nonvolatile memory, such as a flash memory, an EEPROM (electrically erasable programmable read only memory), an MRAM (magnetoresistive random access memory), or an FeRAM (ferroelectric RAM), and stores data supplied from the CPU 103. The data stored in the storage unit 104 includes a memory ID transmitted from the terminal apparatus 11.

Now, a copy process is described with reference to the flowchart shown in FIG. 5. In this process, a predetermined piece of data is selected with the pen 12 from data displayed on the display unit 71 of the terminal apparatus 11, and the selected piece of data is pasted on a position different from the original position. In the flowchart shown in FIG. 5, the steps performed in the terminal apparatus 11 are associated with corresponding steps performed in the pen 12 with dotted lines so that the relationship between the process in the terminal apparatus 11 and the process in the pen 12 can be clearly understood.

Figure 5:
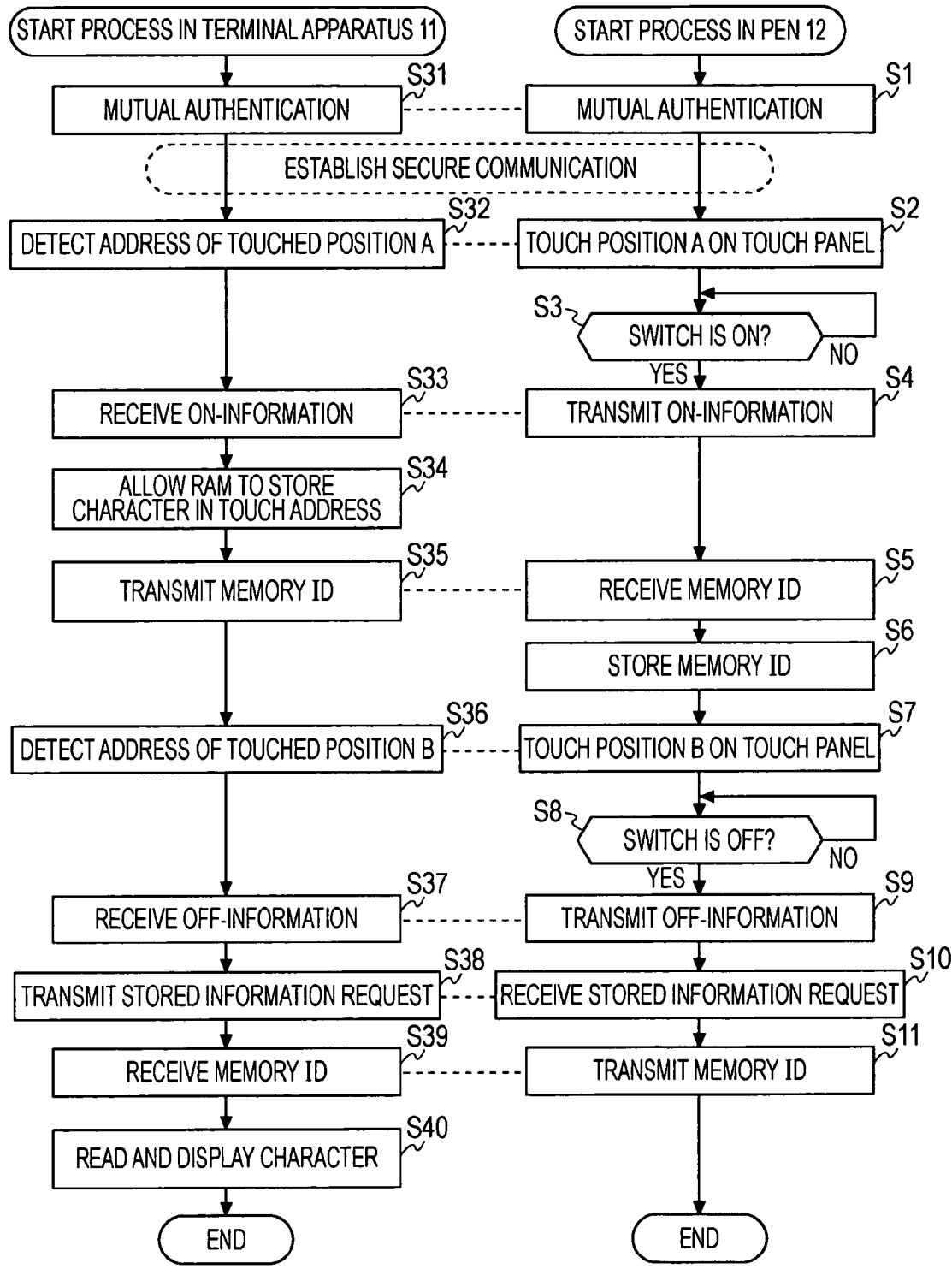
FIG. 5 is a flowchart illustrating a copy process performed by the display system shown in FIG. 1.

Assume that, in the terminal apparatus 11, a predetermined application is started and predetermined data is displayed on the display unit 71 at the time when the process shown in FIG. 5 starts. In the example described below, a document creating software application is started, sentences (characters) are displayed on the display unit 71, and the data to be copied (indicated) is a character.

After a user moves the pen 12 into a range of the short distance from the terminal apparatus 11, the pen 12 extracts power from radio waves transmitted from the terminal apparatus 11 and starts up. Then, the pen 12 responds to a polling command from the terminal apparatus 11 and performs authentication in step S1.

In step S31, the terminal apparatus 11 transmits a polling command and detects the pen 12 that has responded to the polling command. Then, the terminal apparatus 11 authenticates the pen 12.

That is, mutual authentication using a challenge response method or the like is performed between the terminal apparatus 11 and the pen 12, whereby secure communication is established.

In step S2, the pen 12 touches a predetermined position (touched position A) on the touch panel 72 by an operation of the user. In step S32, the terminal apparatus 11 detects the address of the touched position A (touch address A) in accordance with step S2 of the pen 12.

In step S3, the pen 12 determines whether the user has turned on (pressed) the switch 31, or waits until the switch 31 is turned on. After the switch 31 has been turned on (pressed), that is, after an ON-operation signal has been supplied from the switch 31 to the CPU 103, the process proceeds to step S4, where the pen 12 transmits ON-information to the terminal apparatus 11.

In step S33, the terminal apparatus 11 receives the ON-information from the pen 12, and the process proceeds to step S34.

In step S34, the terminal apparatus 11 allows the RAM 53 to store the character at touch address A displayed on the display unit 71 (hereinafter referred to as a copied character). Then, in step S35, the terminal apparatus 11 transmits a memory ID to identify the copied character stored in the RAM 53 to the pen 12.

In accordance with step S35 of the terminal apparatus 11, the pen 12 receives the memory ID transmitted from the terminal apparatus 11 in step S5. In step S6, the storage unit 104 stores the memory ID.

In step S7, the user operates the pen 12 so that the pen 12 touches a predetermined position (touched position B) on the touch panel 72. In accordance with this step, the terminal apparatus 11 detects the address of the touched position B (touch address B) and stores it in the RAM 53 in step S36.

In step S8, the pen 12 determines whether the user has turned off (released) the switch 31, or waits until the switch 31 is turned off. After the switch 31 has been turned off, that is, after an OFF-operation signal has been supplied from the switch 31 to the CPU 103, the process proceeds to step S9, where the pen 12 transmits OFF-information to the terminal apparatus 11.

In step S37, the terminal apparatus 11 receives the OFF-information from the pen 12. In step S38, the terminal apparatus 11 transmits a stored information request to the pen 12 in order to request information stored in the pen 12.

In step S10, the pen 12 receives the stored information request from the terminal apparatus 11. In step S11, the pen 12 transmits the memory ID, which is stored in the storage unit 104, to the terminal apparatus 11 in response to the stored information request.

In step S39, the terminal apparatus 11 receives the memory ID transmitted from the pen 12. In step S40, the terminal apparatus 11 reads the copied character stored in the RAM 53 on the basis of the received memory ID and displays the read character at the touched position B on the display unit 71. More specifically, the CPU 51 specifies touch address B and supplies the copied character corresponding to the memory ID read from the RAM 53 to the display unit 71, so as to end the copy process.

Accordingly, the character displayed at touch address A of the display unit 71 is also displayed at touch address B (the character is copied).

Figure 6:
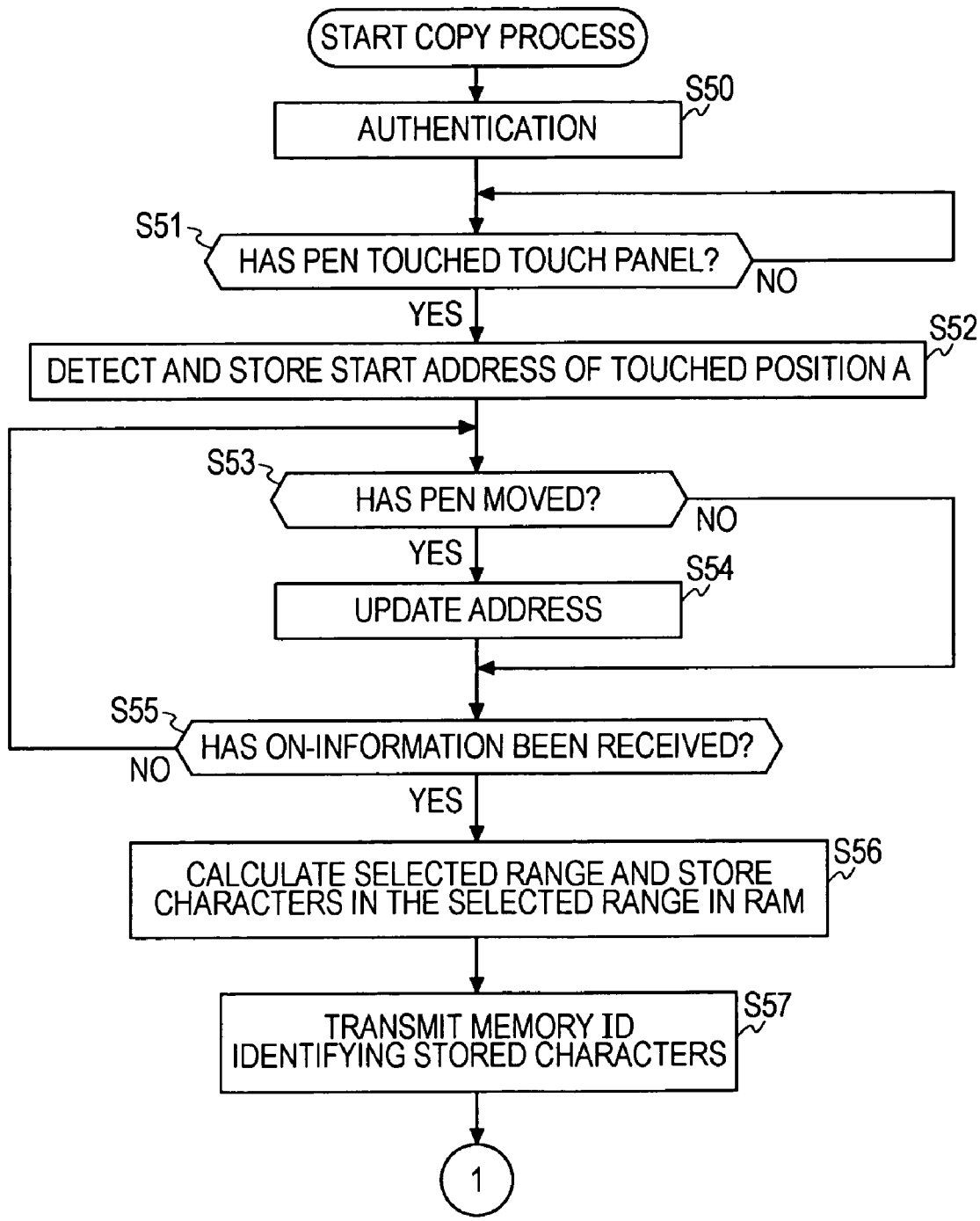
FIG. 6 is a flowchart illustrating a copy process performed by the terminal apparatus.
Figure 7:
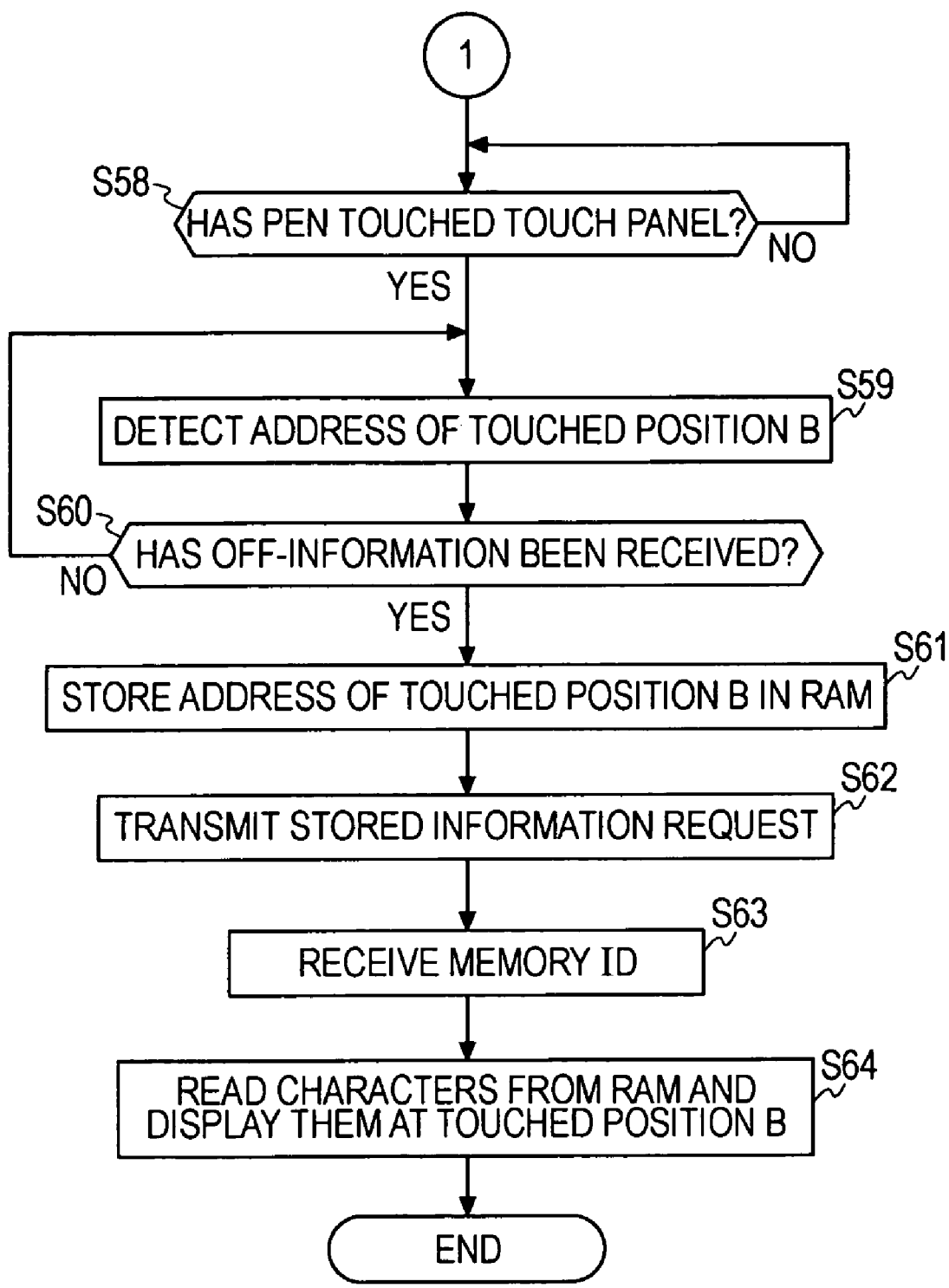
FIG. 7 is a flowchart illustrating the copy process performed by the terminal apparatus.

Next, the copy process performed in the terminal apparatus 11 is further described with reference to the flowchart shown in FIGS. 6 and 7. In the above-described process shown in FIG. 5, one character is selected and copied with the pen 12 by the user (the copied character corresponds to one address). In the copy process shown in FIGS. 6 and 7, a plurality of characters in a word or a sentence are copied. The copy process performed in the pen 12 in FIGS. 6 and 7 is the same as that shown in FIG. 5, and thus the corresponding description is omitted.

In step S50, the terminal apparatus 11 transmits a polling command and detects the pen 12 that has responded to the polling command. Then, the terminal apparatus 11 authenticates the pen 12.

In step S51, the touch panel 72 of the terminal apparatus 11 determines whether the pen 12 has touched the touch panel 72, or waits until the pen 12 touches the touch panel 72.

If it is determined in step S51 that the pen 12 has touched the touch panel 72, the process proceeds to step S52, where the touch panel 72 detects the address of a touched position A where the pen 12 touches (start address) and supplies the start address to the CPU 51. Also, in step S52, the CPU 51 allows the RAM 53 to store the start address of the touched position A supplied from the touch panel 72.

In step S53, the touch panel 72 determines whether the pen 12 has moved. If it is determined in step S53 that the pen 12 has not moved, the process skips to step S55.

On the other hand, if it is determined in step S53 that the pen 12 has moved, that is, if the touch panel 72 has detected an address on the touch panel 72 with which the pen 12 is in touch, the address being different from the start address of the touched position A, the touch panel 72 updates the address in step S54. That is, in step S54, the touch panel 72 supplies an address that is different from the start address of the touched position A to the CPU 51, and then the process proceeds to step S55.

In step S55, the CPU 51 determines whether it has received ON-information from the pen 12 through the NFC communication unit 58. If the CPU 51 determines that it has not received ON-information, the process returns to step S53. Then, steps S53 to S55 are repeated, so that the position (address) on the touch panel 72 touched by the pen 12 is continuously updated until the terminal apparatus 11 receives ON-information from the pen 12.

If it is determined in step S55 that ON-information has been received, the process proceeds to step S56, where the CPU 51 regards the address supplied from the touch panel 72 as an end address of the touched position A and calculates a range on the display unit 71 selected with the pen 12 by the user (a range from the start address to the end address of the touched position A). Then, the CPU 51 allows the RAM 53 to store the characters to be copied, which are displayed in the selected range of the display unit 71.

In step S57, the CPU 51 transmits a memory ID to identify the copied characters stored in the RAM 53 to the pen 12 through the NFC communication unit 58 (allows the NFC communication unit 58 to transmit the memory ID).

In step S58, the touch panel 72 of the terminal apparatus 11 determines whether the pen 12 has touched the touch panel 72, or waits until the pen 12 touches the touch panel 72. That is, the terminal apparatus 11 waits until the position on the touch panel 72 to which the characters are to be copied (touched position B) is specified by the pen 12.

If it is determined in step S58 that the pen 12 has touched the touch panel 72, the process proceeds to step S59, where the touch panel 72 detects the address of the touched position B with which the pen 12 is in touch, and supplies the address to the CPU 51.

In step S60, the CPU 51 determines whether it has received OFF-information from the pen 12 through the NFC communication unit 58. If the CPU 51 determines that it has not received OFF-information, the process returns to step S59. Then, steps S59 to S60 are repeated. Accordingly, the position (address) on the touch panel 72 with which the pen 12 is in touch, the address being supplied from the touch panel 72 to the CPU 51, is continuously updated until the terminal apparatus 11 receives OFF-information.

On the other hand, if the CPU 51 determines in step S60 that it has received OFF-information, the process proceeds to step S61, where the CPU 51 allows the RAM 53 to store the address of the touched position B supplied from the touch panel 72, and the process proceeds to step S62.

In step S62, the CPU 51 transmits a stored information request to the pen 12 in order to request the information stored in the pen 12.

The pen 12 transmits the memory ID in response to the stored information request from the terminal apparatus 11. Accordingly, the CPU 51 of the terminal apparatus 11 receives the memory ID transmitted from the pen 12 through the NFC communication unit 58 in step S63. Then, the process proceeds to step S64.

In step S64, the CPU 51 reads the copied characters stored in the RAM 53 on the basis of the received memory ID and displays the copied characters at the touched position B on the display unit 71. That is, the CPU 51 specifies touch address B and supplies the copied characters corresponding to the memory ID read from the RAM 53 to the display unit 71, so as to end the copy process.

In the known copy process using a touch panel and a pen (copy and paste), a user has to do the following four operations (specify four positions on the touch panel): specifying a copy command, selecting (specifying) a character to be copied, specifying a paste command, and specifying a position where the character is to be pasted. However, in the above-described copy process performed in the display system 1, only two operations (specification of two positions on the touch panel 72): specifying a character to be copied and specifying a position where the character is to be pasted, are required when the process is performed in cooperation with the switch 31 of the pen 12.

The operations performed on the switch 31 by a user are the same as operations of capturing a real object at an original position, moving the object while holding it, and releasing the object at another position so that the object is pasted there. Therefore, the user can intuitively understand these operations. In other words, data displayed on the display unit 71 (screen) can be copied more easily.

The terminal apparatus 11 and the pen 12 perform mutual authentication, and the data transmitted between the terminal apparatus 11 and the pen 12 is encrypted in a predetermined encryption scheme. Therefore, communication can be securely performed while preventing tapping and tampering.

The following operation can be performed by using the above-described copy process. For example, in an application to display a schedule, frequently-used words such as "business trip", "meeting", "day off", and "guest" are constantly displayed in part of a display area (referred to as a word list area), and a user allows the pen 12 to touch a word to be copied displayed in the word list area while pressing (turning on) the switch 31 and releases (turns off) the switch 31 while allowing the pen 12 to touch an area of a desired date. In this operation, handwritten input or keyboard input can be simplified, and thus data can be input more easily (with a fewer number of touches on the touch panel 72).

In the above-described example, if a character to be copied is specified, the CPU 51 allows the RAM 53 to store the character and transmits a memory ID identifying the character to the pen 12. However, the character to be copied can be transmitted to the pen 12.

In the above-described example, a character (selected by the pen 12) is copied within the display area of the display unit 71 of one terminal apparatus 11. However, a character can be copied from a display unit of a terminal apparatus to that of another terminal apparatus. Hereinafter, such a case is described with reference to FIG. 8.

Figure 8:
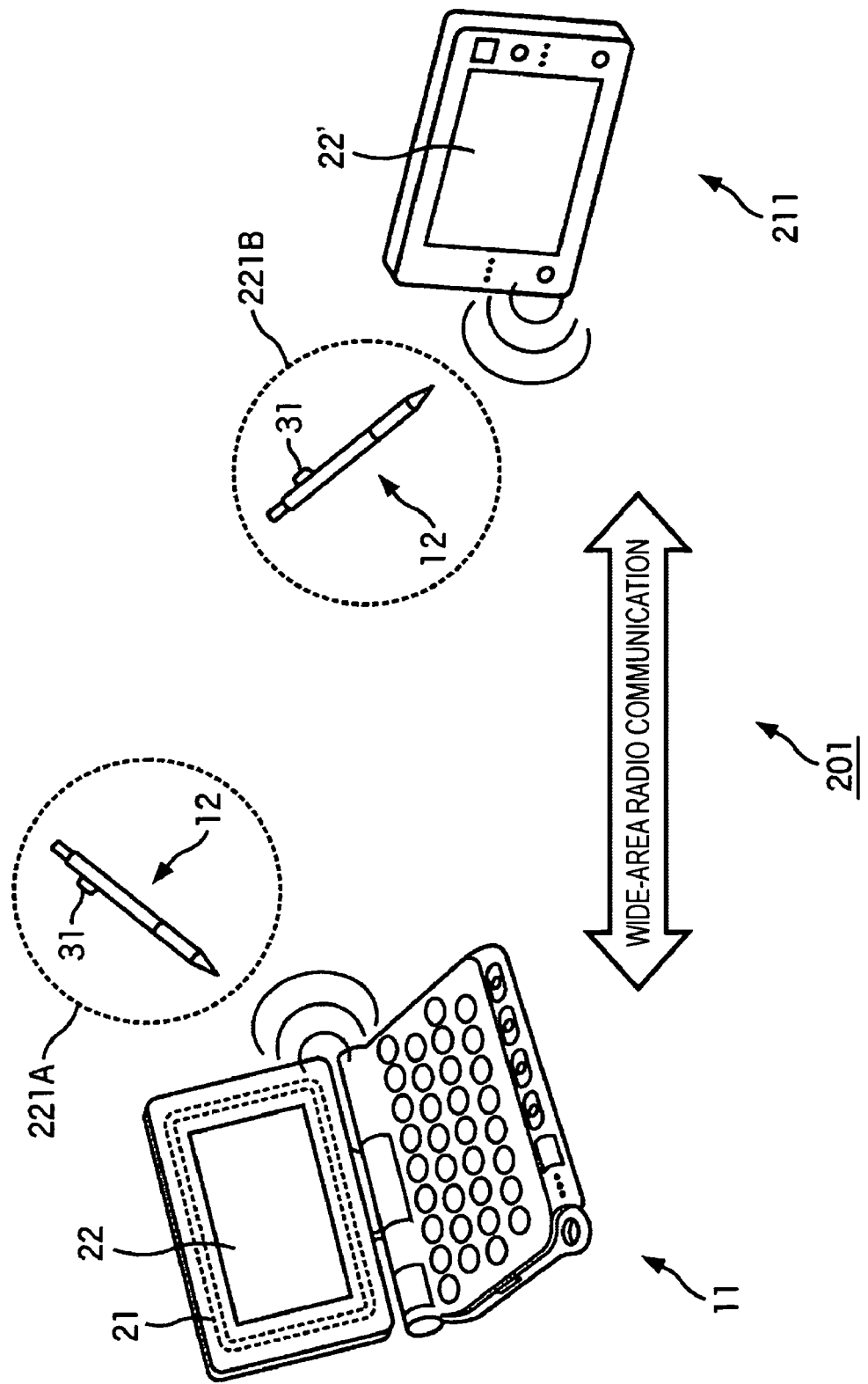
FIG. 8 shows an example of a configuration of a display system according to another embodiment of the present invention.

FIG. 8 shows an example of a configuration of a display system according to another embodiment of the present invention. In FIG. 8, parts corresponding to those in FIG. 1 are denoted by the same reference numerals, and the corresponding description is omitted.

A display system 201 shown in FIG. 8 includes the terminal apparatus 11, the pen 12, and a terminal apparatus 211.

The terminal apparatus 211 has the same configuration as that of the terminal apparatus 11 shown in FIGS. 2 and 3, and thus the detailed description thereof is not repeated here. In the following description, the processing unit of the terminal apparatus 211 is described by citing the processing unit of the terminal apparatus 11 shown in FIGS. 2 and 3. In the description, each element corresponding to that shown in FIGS. 2 and 3 is denoted by reference numeral with a dash ('). For example, the CPU of the terminal apparatus 211 is denoted by reference numeral 51'.

The terminal apparatuses 11 and 211 can communicate with each other through a longer distance than the above-described short distance (in a wider range) by using the communication unit 59 and a communication unit 59', respectively. For example, the terminal apparatuses 11 and 211 perform radio communication based on a standard, such as IEEE 802.11a, IEEE 802.11b, IEEE 802.11g, or Bluetooth® (this type of communication is called "wide-area radio communication" by distinguishing it from the near field communication).

When the pen 12 is within the short distance from the terminal apparatus 11, for example, when the pen 12 is at the position indicated by a dotted line 221A shown in FIG. 8, the pen 12 can perform near field communication with the terminal apparatus 11.

On the other hand, when the pen 12 is within the short distance from the terminal apparatus 211, for example, when the pen 12 is at the position indicated by a dotted line 221B shown in FIG. 8, the pen 12 can perform near field communication with the terminal apparatus 211.

When a user turns on the switch 31 while allowing the pen 12 to touch a character (data) displayed on the touch-panel display 22, the terminal apparatus 11 transmits a memory ID (data identifying information) identifying the character to be copied indicated by the pen 12 (indicated data) to the pen 12 by near field communication.

Then, the user allows the pen 12 to touch a predetermined position on a touch-panel display 22' of the terminal apparatus 211 and turns off (releases) the switch 31. Accordingly, the pen 12 transmits the memory ID, which has been transmitted from the terminal apparatus 11 and is stored therein, to the terminal apparatus 211 by near field communication.

The terminal apparatus 211 receives the memory ID transmitted from the pen 12 through near field communication. Then, the terminal apparatus 211 transmits the received memory ID to the terminal apparatus 11 by wide-area radio communication, receives the copied character corresponding to the memory ID, and displays the copied character on the touch-panel display 22'.

Now, a copy process performed in the display system 201 shown in FIG. 8 is described with reference to the flowchart shown in FIG. 9.

Figure 9:
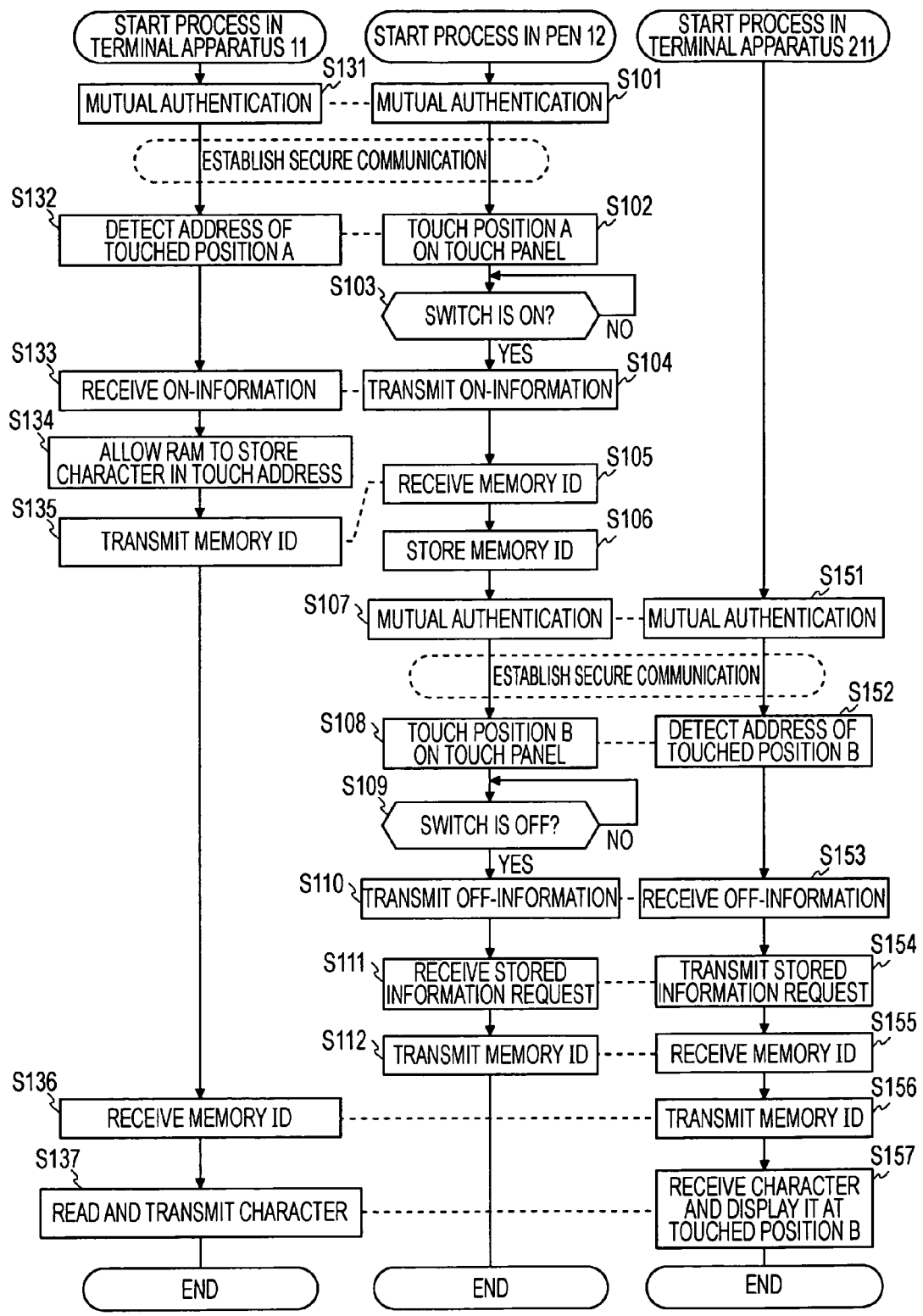
FIG. 9 is a flowchart illustrating a copy process performed by the display system shown in FIG. 8.

In FIG. 9, steps S101 to S106 performed by the pen 12 are the same as steps S1 to S6 shown in FIG. 5, and thus the corresponding description is omitted. Also, steps S131 to S135 performed by the terminal apparatus 11 are the same as steps S31 to S35 shown in FIG. 5, and thus the corresponding description is omitted.

After a memory ID identifying the copied character is stored in the storage unit 104 of the pen 12 in step S106, the user moves the pen 12 into a range of the short distance from the terminal apparatus 211.

In step S107, the pen 12 extracts power from the radio waves transmitted from the terminal apparatus 211 and starts up. Also, in step S107, the pen 12 responds to a polling command from the terminal apparatus 211 and performs authentication.

In step S151, the terminal apparatus 211 transmits a polling command and detects the pen 12 that has responded thereto. Then, the terminal apparatus 211 authenticates the pen 12.

That is, mutual authentication using a challenge response method or the like is performed between the terminal apparatus 211 and the pen 12. Accordingly, secure communication is established.

In step S108, the user allows the pen 12 to touch a predetermined position (touched position B) on the touch panel 72'. In step S152, the terminal apparatus 211 detects the address (touch address B) of the touched position B and allows a RAM 53' to store the address.

In step S109, the pen 12 determines whether the user has turned off the switch 31 (whether the user has released the switch 31), or waits until the switch 31 is turned off. After the switch 31 has been turned off, that is, after an OFF-operation signal has been supplied from the switch 31 to the CPU 103, the process proceeds to step S110, where the pen 12 transmits OFF-information to the terminal apparatus 211.

In step S153, the terminal apparatus 211 receives the OFF-information from the pen 12. In step S154, the terminal apparatus 211 transmits a stored information request to the pen 12 in order to request the information stored in the pen 12.

In step S111, the pen 12 receives the stored information request from the terminal apparatus 211. In step S112, the pen 12 transmits the memory ID stored in the storage unit 104 to the terminal apparatus 211 in response to the stored information request.

In step S155, the terminal apparatus 21 receives the memory ID from the pen 12. In step S156, the terminal apparatus 211 transmits the received memory ID to the terminal apparatus 11 through wide-area radio communication.

In step S136, the terminal apparatus 11 receives the memory ID, which is transmitted from the terminal apparatus 211 through wide-area communication. Then, in step S137, the terminal apparatus 11 reads the copied character stored in the RAM 53 on the basis of the received memory ID and transmits the copied character to the terminal apparatus 211.

In step S157, the terminal apparatus 211 receives the copied character transmitted from the terminal apparatus 11 through wide-area communication, and displays the received character at the touched position B on the display unit 71'. More specifically, the CPU 51' specifies touch address B and supplies the received character to the display unit 71', so as to end the copy process.

As described above, according to the copy process shown in FIG. 9, a character can be copied from one terminal apparatus to another in the same manner as that of copying a character within the display unit 71 of one terminal apparatus 11. That is, data displayed on the display unit 71 (screen) can be copied more easily.

When a copy process is performed between different terminal apparatuses, a copied character itself can be transmitted to the pen 12 instead of a memory ID identifying the copied character. In that case, the copied character (indicated data) is moved through the pen 12, and thus wide-area communication between the terminal apparatuses 11 and 211 can be omitted.

In the above-described example, data displayed on the display unit 71 is copied. With the same operation as that described above, data can be moved (moved from the touched position A to the touched position B). Further, this operation can be associated with another process.

In the above-described example, data to be copied (or moved) or indicated data is a character. However, the data to be copied may be an image or an icon (mark). Furthermore, the data to be copied may be a file (file of content such as an image or voice) expressed by characters, an image, or an icon on a display.

In this specification, the steps described in the flowcharts may be performed in time series in accordance with the described order or may be performed in parallel or individually.

In this specification, a system means an entire unit including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a first information processor to process data to be displayed in first display means; and
a second information processor to indicate the data displayed in the first display means,
the first information processor including
first display control means for controlling the data to be displayed in the first display means;
first communication means for receiving operation information indicating an operation performed by a user in the second information processor from the second information processor and transmitting data information about a piece of data indicated by the second information processor among the data displayed in the first display means; and
first detecting means for detecting a position on the first display means indicated by the second information processor, and the second information processor including
accepting means for accepting an operation by a user;
second communication means for transmitting operation information indicating an operation performed by the user to the first information processor and receiving the data information from the first information processor; and
received data storage means for storing the data information received by the second communication means,
wherein the accepting means accepts a first operation performed by the user,
the second communication means transmits operation information indicating the first operation to the first information processor,
the first communication means receives the operation information indicating the first operation from the second information processor,
after the operation information indicating the first operation has been received, the first detecting means detects a first position on the first display means indicated by the second information processor,
the first communication means transmits the data information about the indicated data displayed at the first position,
the second communication means receives the data information from the first information processor,
the received data storage means stores the data information received by the second communication means,
the accepting means accepts a second operation performed by the user,
the second communication means transmits operation information indicating the second operation to the first information processor,
the first communication means receives the operation information indicating the second operation from the second information processor and transmits a request for the data information to the second information processor,
after the operation information indicating the second operation has been received, the first detecting means detects a second position on the first display means indicated by the second information processor,
the second communication means transmits the data information stored in the received data storage means in response to the request for the data information from the first information processor,
the first communication means receives the data information transmitted from the second information processor, and
the first display control means displays the indicated data at the second position of the first display means on the basis of the data information received by the first communication means.

2. The information processing system according to claim 1, wherein the data information is the indicated data.

3. The information processing system according to claim 1, wherein the data information is data identifying information to identify the indicated data,
the first information processor further includes indicated data storage means for storing the indicated data indicated by the second information processor, and
the first display control means allows the indicated data storage means to store the indicated data displayed at the first position detected by the first detecting means and displays the indicated data stored in the indicated data storage means at the second position of the first display means on the basis of the data identifying information received by the first communication means.

4. The information processing system according to claim 1, wherein the accepting means is a switch,
the first operation is pressing the switch, and
the second operation is releasing the switch.

5. The information processing system according to claim 1, wherein the first or second communication means performs near field communication through radio waves, and
wherein the second information processor further includes power extracting means for extracting power from radio waves transmitted from the first communication means and starts up when a predetermined or more amount of power is extracted by the power extracting means.

6. The information processing system according to claim 1, further comprising:
a third information processor to communicate with the second information processor,
the third information processor including
second display control means for controlling the data to be displayed in second display means;
third communication means for receiving operation information indicating an operation performed by the user in the second information processor from the second information processor and receiving data information about the indicated data from the second information processor; and
second detecting means for detecting a position on the second display means indicated by the second information processor,
wherein the third communication means receives operation information indicating the second operation from the second information processor and transmits a request for the data information to the second information processor,
after the operation information indicating the second operation has been received, the second detecting means detects a third position on the second display means indicated by the second information processor,
the third communication means receives the data information transmitted from the second information processor in response to the request for the data information, and
the second display control means displays the indicated data at the third position of the second display means on the basis of the data information received by the third communication means.

7. The information processing system according to claim 6, wherein the data information is the indicated data.

8. The information processing system according to claim 6, wherein the data information is data identifying information to identify the indicated data,
the first information processor further includes
indicated data storage means for storing the indicated data indicated by the second information processor; and
fourth communication means for communicating with the third information processor in a communication method different from that of the first communication means,
the third information processor further includes
fifth communication means for communicating with the first information processor in a communication method which is different from that of the third communication means and which is the same as that of the fourth communication means,
the first display control means allows the indicated data storage means to store the indicated data displayed at the first position detected by the first detecting means,
the fifth communication means transmits the data identifying information that has been received by the third communication means from the second information processor to the first information processor,
the fourth communication means receives the data identifying information transmitted from the third information processor and transmits the indicated data stored in the indicated data storage means to the third information processor on the basis of the data identifying information,
the fifth communication means receives the indicated data transmitted from the first information processor, and
the second display control means displays the indicated data received by the fifth communication means at the third position of the second display means.

9. An information processing method for an information processing system including a first information processor and a second information processor, the first information processor including display control means for controlling data to be displayed in display means of the first information processor; first communication means for receiving operation information indicating an operation performed by a user in the second information processor from the second information processor and transmitting data information about a piece of data indicated by the second information processor among the data displayed in the display means; and detecting means for detecting a position on the display means indicated by the second information processor, and the second information processor including accepting means for accepting an operation by a user; second communication means for transmitting operation information indicating an operation performed by the user to the first information processor and receiving the data information from the first information processor; and received data storage means for storing the data information received by the second communication means, the information processing method comprising the steps of:
accepting, in the accepting means, a first operation performed by the user;
transmitting, in the second communication means, operation information indicating the first operation to the first information processor;
receiving, in the first communication means, the operation information indicating the first operation from the second information processor;
detecting, in the detecting means, a first position on the display means indicated by the second information processor after the operation information indicating the first operation has been received;
transmitting, in the first communication means, the data information about the indicated data displayed at the first position;
receiving, in the second communication means, the data information from the first information processor;
storing, in the received data storage means, the data information received by the second communication means;
accepting, in the accepting means, a second operation performed by the user;
transmitting, in the second communication means, operation information indicating the second operation to the first information processor;
receiving, in the first communication means, the operation information indicating the second operation from the second information processor and transmitting a request for the data information to the second information processor;

detecting, in the detecting means, a second position on the display means indicated by the second information processor after the operation information indicating the second operation has been received;

transmitting, in the second communication means, the data information stored in the received data storage means in response to the request for the data information from the first information processor;

receiving, in the first communication means, the data information transmitted from the second information processor; and displaying, in the display control means, the indicated data at the second position of the display means on the basis of the data information received by the first communication means.

10. An information processor that processes data to be displayed in display means and that communicates with a first apparatus indicating data displayed in the display means, the information processor comprising:

display control means for controlling the data to be displayed in the display means;

first communication means for receiving operation information indicating an operation performed by a user in the first apparatus from the first apparatus and transmitting data information about a piece of data indicated by the first apparatus among the data displayed in the display means; and detecting means for detecting a position on the display means indicated by the first apparatus, wherein the first communication means receives operation information indicating a first operation performed by the user from the first apparatus, after the first communication means has received the operation information indicating the first operation, the detecting means detects a first position on the display means indicated by the first apparatus, the first communication means transmits the data information about the indicated data displayed at the first position and transmits a request for the data information to the first apparatus after receiving operation information indicating a second operation performed by the user from the first apparatus, after the first communication means has received the operation information indicating the second operation, the detecting means detects a second position on the display means indicated by the first apparatus, the first communication means receives the data information transmitted from the first apparatus in response to the request for the data information, and the display control means displays the indicated data at the second position of the display means on the basis of the data information received by the first communication means.

11. The information processor according to claim 10, wherein the data information is the indicated data.

12. The information processor according to claim 10, wherein the data information is data identifying information to identify the indicated data, the information processor further comprises indicated data storage means for storing the indicated data indicated by the first apparatus, and the display control means allows the indicated data storage means to store the indicated data displayed at the first position detected by the detecting means and displays the indicated data stored in the indicated data storage means at the second position of the display means on the basis of the data identifying information received by the first communication means.

13. The information processor according to claim 10, further comprising:

second communication means for communicating with a second apparatus in a communication method different from that of the first communication means, wherein the display control means allows the indicated data storage means to store the indicated data displayed at the first position detected by the detecting means, and the second communication means receives the data identifying information transmitted from the second apparatus and transmits the indicated data stored in the indicated data storage means to the second apparatus on the basis of the data identifying information.

14. The information processor according to claim 10, wherein the first communication means performs near field communication with the first apparatus through radio waves, and the first apparatus includes power extracting means for extracting power from radio waves transmitted from the first communication means and starts up when a predetermined or more amount of power is extracted by the power extracting means.

15. An information processing method for an information processor including display control means for controlling data to be displayed in display means, first communication means for receiving operation information indicating an operation performed by a user in another apparatus from said another apparatus and transmitting data information about a piece of data indicated by said another apparatus among the data displayed in the display means, and detecting means for detecting a position on the display means indicated by said another apparatus, the information processing method comprising the steps of:

receiving, in the first communication means, operation information indicating a first operation performed by the user from said another apparatus;

detecting, in the detecting means, a first position on the display means indicated by said another apparatus after the first communication means has received the operation information indicating the first operation;

transmitting, in the first communication means, the data information about the indicated data displayed at the first position, and transmitting a request for the data information to said another apparatus after receiving operation information indicating a second operation performed by the user from said another apparatus;

detecting, in the detecting means, a second position on the display means indicated by said another apparatus after the first communication means has received the operation information indicating the second operation;

receiving, in the first communication means, the data information transmitted from said another apparatus in response to the request for the data information; and displaying, in the display control means, the indicated data at the second position of the display means on the basis of the data information received by the first communication means.

16. A computer readable medium, encoded with a computer program allowing a computer to execute information processing for an information processor including display control means for controlling data to be displayed in display means, first communication means for receiving operation information indicating an operation performed by a user in another apparatus from said another apparatus and transmitting data information about a piece of data indicated by said another apparatus among the data displayed in the display means, and detecting means for detecting a position on the display means indicated by said another apparatus, the program comprising the steps of:
- receiving, in the first communication means, operation information indicating a first operation performed by the user from said another apparatus;
- detecting, in the detecting means, a first position on the display means indicated by said another apparatus after the first communication means has received the operation information indicating the first operation;
- transmitting, in the first communication means, the data information about the indicated data displayed at the first position, and transmitting a request for the data information to said another apparatus after receiving operation information indicating a second operation performed by the user from said another apparatus;
- detecting, in the detecting means, a second position on the display means indicated by said another apparatus after the first communication means has received the operation information indicating the second operation;
- receiving, in the first communication means, the data information transmitted from said another apparatus in response to the request for the data information; and
- displaying, in the display control means, the indicated data at the second position of the display means on the basis of the data information received by the first communication means.

17. An information processor that communicates with another apparatus including display means and that indicates data displayed in the display means, the information processor comprising:
- accepting means for accepting an operation performed by a user;
- communication means for transmitting operation information indicating the operation performed by the user to said another apparatus and receiving data information about a piece of data indicated by the information processor among the data displayed in the display means from said another apparatus; and
- received data storage means for storing the data information received by the communication means,
- wherein the accepting means accepts a first operation performed by the user,
- the communication means transmits operation information indicating the first operation to said another apparatus and receives the data information from said another apparatus,
- the received data storage means stores the data information received by the communication means,
- the accepting means accepts a second operation performed by the user, and
- the communication means transmits operation information indicating the second operation to said another apparatus, and transmits the data information stored in the received data storage means to said another apparatus after receiving a request for the data information from said another apparatus.

18. The information processor according to claim 17, wherein the data information is the indicated data or data identifying information to identify the indicated data.

19. The information processor according to claim 17, wherein the accepting means is a switch, the first operation is pressing the switch, and the second operation is releasing the switch.

20. The information processor according to claim 17, wherein the communication means performs near field communication with said another apparatus through radio waves.

21. An information processing method for an information processor including accepting means for accepting an operation performed by a user, communication means for transmitting operation information indicating the operation performed by the user to another apparatus and receiving data information about indicated data among data displayed in display means of said another apparatus from said another apparatus, and received data storage means for storing the data information received by the communication means, the information processing method comprising the steps of:
- accepting, in the accepting means, a first operation performed by the user;
- transmitting, in the communication means, operation information indicating the first operation to said another apparatus and receiving the data information from said another apparatus;
- storing, in the received data storage means, the data information received by the communication means;
- accepting, in the accepting means, a second operation performed by the user; and
- transmitting, in the communication means, operation information indicating the second operation to said another apparatus, and transmitting the data information stored in the received data storage means to said another apparatus after receiving a request for the data information from said another apparatus.

22. A computer readable medium, encoded with a computer program allowing a computer to execute information processing for an information processor including accepting means for accepting an operation performed by a user, communication means for transmitting operation information indicating the operation performed by the user to another apparatus and receiving data information about indicated data among data displayed in display means of said another apparatus from said another apparatus, and received data storage means for storing the data information received by the communication means, the program comprising the steps of:
- accepting, in the accepting means, a first operation performed by the user;
- transmitting, in the communication means, operation information indicating the first operation to said another apparatus and receiving the data information from said another apparatus;
- storing, in the received data storage means, the data information received by the communication means;
- accepting, in the accepting means, a second operation performed by the user; and
- transmitting, in the communication means, operation information indicating the second operation to said another apparatus, and transmitting the data information stored in the received data storage means to said another apparatus after receiving a request for the data information from said another apparatus.

23. An information processing system comprising:
- a first information processor to process data to be displayed in a first display unit; and
- a second information processor to indicate the data displayed in the first display unit,
- the first information processor including
  - a first display control unit configured to control the data to be displayed in the first display unit;
  - a first communication unit configured to receive operation information indicating an operation performed by a user in the second information processor from the second information processor and transmit data information about a piece of data indicated by the second information processor among the data displayed in the first display unit; and a first detecting unit configured to detect a position on the first display unit indicated by the second information processor, and the second information processor including an accepting unit configured to accept an operation by a user;

a second communication unit configured to transmit operation information indicating an operation performed by the user to the first information processor and receive the data information from the first information processor; and a received data storage unit configured to store the data information received by the second communication unit, wherein the accepting unit accepts a first operation performed by the user, the second communication unit transmits operation information indicating the first operation to the first information processor, the first communication unit receives the operation information indicating the first operation from the second information processor, after the operation information indicating the first operation has been received, the first detecting unit detects a first position on the first display unit indicated by the second information processor, the first communication unit transmits the data information about the indicated data displayed at the first position, the second communication unit receives the data information from the first information processor, the received data storage unit stores the data information received by the second communication unit, the accepting unit accepts a second operation performed by the user, the second communication unit transmits operation information indicating the second operation to the first information processor, the first communication unit receives the operation information indicating the second operation from the second information processor and transmits a request for the data information to the second information processor, after the operation information indicating the second operation has been received, the first detecting unit detects a second position on the first display unit indicated by the second information processor, the second communication unit transmits the data information stored in the received data storage unit in response to the request for the data information from the first information processor, the first communication unit receives the data information transmitted from the second information processor, and the first display control unit displays the indicated data at the second position of the first display unit on the basis of the data information received by the first communication unit.

24. An information processor that processes data to be displayed in a display unit and that communicates with a first apparatus indicating data displayed in the display unit, the information processor comprising:

a display control unit configured to control the data to be displayed in the display unit;

a first communication unit configured to receive operation information indicating an operation performed by a user in the first apparatus from the first apparatus and transmitting data information about a piece of data indicated by the first apparatus among the data displayed in the display unit; and a detecting unit configured to detect a position on the display unit indicated by the first apparatus, wherein the first communication unit receives operation information indicating a first operation performed by the user from the first apparatus, after the first communication unit has received the operation information indicating the first operation, the detecting unit detects a first position on the display unit indicated by the first apparatus, the first communication unit transmits the data information about the indicated data displayed at the first position and transmits a request for the data information to the first apparatus after receiving operation information indicating a second operation performed by the user from the first apparatus, after the first communication unit has received the operation information indicating the second operation, the detecting unit detects a second position on the display unit indicated by the first apparatus, the first communication unit receives the data information transmitted from the first apparatus in response to the request for the data information, and the display control unit displays the indicated data at the second position of the display unit on the basis of the data information received by the first communication unit.

25. An information processor that communicates with another apparatus including a display unit and that indicates data displayed in the display unit, the information processor comprising:

an accepting unit configured to accept an operation performed by a user;

a communication unit configured to transmit operation information indicating the operation performed by the user to said another apparatus and receive data information about a piece of data indicated by the information processor among the data displayed in the display unit from said another apparatus; and a received data storage unit configured to store the data information received by the communication unit, wherein the accepting unit accepts a first operation performed by the user, the communication unit transmits operation information indicating the first operation to said another apparatus and receives the data information from said another apparatus, the received data storage unit stores the data information received by the communication unit, the accepting unit accepts a second operation performed by the user, and the communication unit transmits operation information indicating the second operation to said another apparatus, and transmits the data information stored in the received data storage unit to said another apparatus after receiving a request for the data information from said another apparatus.

* * * * *